United States Patent
Wilson

(10) Patent No.: US 11,193,604 B2
(45) Date of Patent: Dec. 7, 2021

(54) INSULATING COVER FOR WATER BACKFLOW PREVENTION APPARATUS

(71) Applicant: Mark Wilson, Greenwood, IN (US)

(72) Inventor: Mark Wilson, Greenwood, IN (US)

(*) Notice: Subject to any disclaimer, the term of this patent is extended or adjusted under 35 U.S.C. 154(b) by 0 days.

(21) Appl. No.: 16/724,990

(22) Filed: Dec. 23, 2019

(65) Prior Publication Data

US 2020/0200288 A1 Jun. 25, 2020

Related U.S. Application Data

(60) Provisional application No. 62/783,298, filed on Dec. 21, 2018.

(51) Int. Cl.
*F16K 27/08* (2006.01)
*F16K 27/12* (2006.01)

(52) U.S. Cl.
CPC .............. *F16K 27/08* (2013.01); *F16K 27/12* (2013.01)

(58) Field of Classification Search
CPC ........... F16K 27/08; F16K 27/12; F16L 59/08
See application file for complete search history.

(56) References Cited

U.S. PATENT DOCUMENTS

| | | | |
|---|---|---|---|
| 4,142,565 A | 3/1979 | Plunkett, Sr. | |
| D349,754 S | 8/1994 | Pawar et al. | |
| 5,740,832 A | 4/1998 | Griffin et al. | |
| 6,206,030 B1 | 3/2001 | Barthuly | |
| 6,293,301 B1 | 9/2001 | Griffin et al. | |
| 6,520,201 B2 | 2/2003 | Sweeney et al. | |
| D486,205 S | 2/2004 | Petschek | |
| 6,820,639 B2 | 11/2004 | Petschek | |
| 8,511,335 B2* | 8/2013 | Murphy | F16L 59/161 137/375 |
| 10,392,180 B1* | 8/2019 | Smith et al. | A45C 11/20 |
| 10,392,802 B2* | 8/2019 | Kreizinger | G01N 3/32 |
| 2013/0216774 A1* | 8/2013 | Conolly et al. | B32B 27/12 428/135 |

* cited by examiner

*Primary Examiner* — Kevin L Lee
(74) *Attorney, Agent, or Firm* — Edward E. Sowers; Brannon Sowers & Cracraft PC

(57) ABSTRACT

A waterproof, mildew resistant, cover for a water backflow prevention apparatus is provided that provides protection of the apparatus's control from UV damage is provided. The cover is constructed from a closed-cell polymeric foam and can be cut to fit when installed. The cover can be anchored to stakes in the ground to prevent dislodgment by wind or animals. The installed cover's open end can take advantage of heat in the ground to maximize the cover's internal temperature when the cover is exposed to low air temperatures.

18 Claims, 3 Drawing Sheets

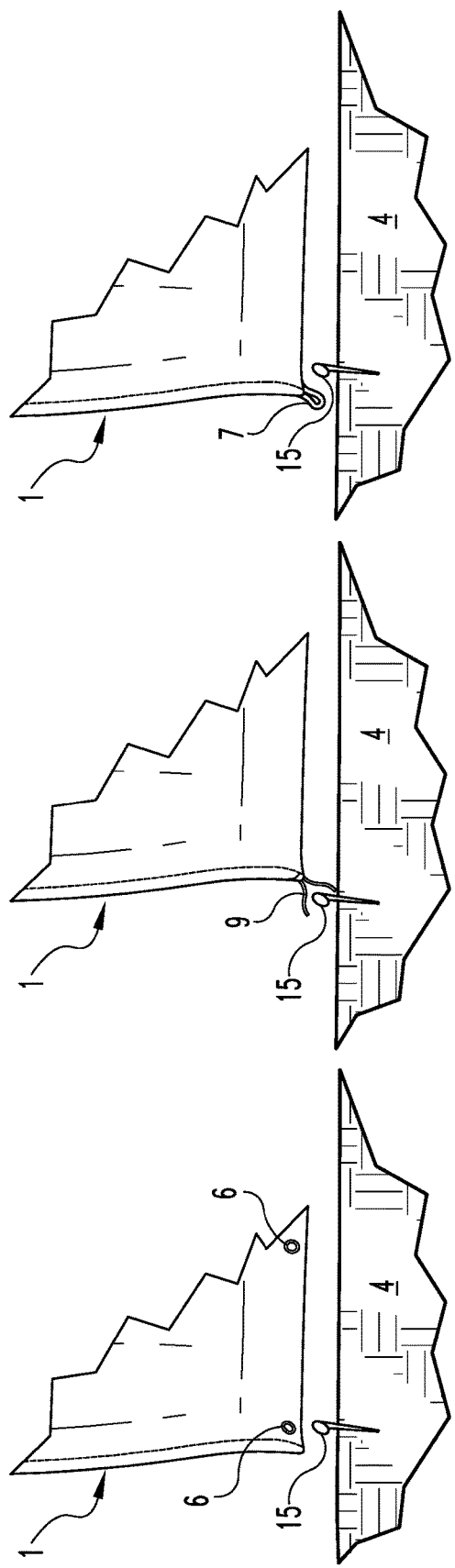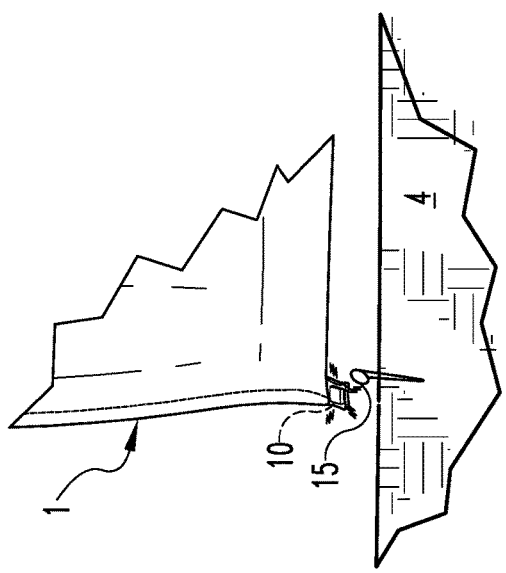

INSULATING COVER FOR WATER BACKFLOW PREVENTION APPARATUS

CROSS-REFERENCES TO RELATED APPLICATIONS

This application claims the benefit of U.S. Provisional Patent Application No. 62/783,298, filed Dec. 21, 2018, and entitled INSULATING COVER FOR WATER BACKFLOW PREVENTION APPARATUS, which is incorporated herein by reference.

TECHNICAL FIELD

This invention relates generally to outdoor area irrigation systems, and more particularly to apparatus to protect from freezing temperatures and to provide UV protection for components of the irrigation systems.

BACKGROUND OF THE INVENTION

In communities where water for outdoor irrigation systems for lawns and gardens and the like are supplied by a public or private water utility, governmental codes or ordinances typically require, at the user site, a backflow preventer at the connection from the utility supply to the user's system. The purpose is to prevent flow of contaminated water backward from the user system into the potable water system of the utility due to back-siphoning conditions. The backflow preventer typically includes rubber-based components that are damaged by long-term exposure to UV light.

One type of backflow prevention apparatus widely used in lawn irrigation systems is a pressure vacuum breaker valve assembly mounted above ground very close to the water meter and between the water outlet from the meter and the inlet to the irrigation system. During the fall of the year, when ambient temperatures are dropping, it sometimes happens that there is an unseasonable and unusually sharp drop in ambient temperature below the freezing mark. The ground is still warm so there is virtually no danger of water freezing in the underground pipes. However, the backflow preventer valve assembly and the pipes leading to and from it, are above ground.

While it is customary to drain lawn irrigation systems during the fall of the year in the colder climates, it often happens that the owner or manager of the property on which the irrigation system is installed, wants irrigation to continue until a time well into the fall of the year, to maintain the appearance of the property. So, the draining of the system may be delayed until a sudden or prolonged drop in ambient temperature is expected. In addition, the owner, manager or irrigation service provider frequently does not have the time to drain all the systems before the temperature unexpectantly drops below freezing. Therefore, the above ground pipes to and from the backflow preventer valve, and which are still pressurized, have water in them which is subjected to the freezing temperatures (typically at night) and can freeze. As a result, breakage of the valve assembly and associated above-ground piping, water damage, and significant loss of water (particularly where the property is unattended) can occur when the temperature rises above freezing. The result is significant cost for repair, wasted water, and possible water damage.

Currently available devices provide some level of protection against freezing but do not further provide protection against substantial amounts of rain, freezing temperatures, UV damage to control components of the backflow system, and allow for the warmth from the ground to enter the protection device to help moderate the device's internal temperature.

It is an object of the present invention to provide a waterproof, and mildew-resistant device for reducing the risk of freezing of water in backflow prevention apparatus subjected to transient below-freezing ambient temperatures, protect against UV damage.

SUMMARY OF THE INVENTION

Described briefly, according to a typical embodiment of the present invention, a cover, somewhat in the nature of a bag, is made of closed pore polymeric thermal insulating material that can be cut to fit the height of the backflow system and the contour of the ground where backflow system is placed. The cover has an open bottom end to fit against the ground when covering the backflow system. To cover the backflow preventer apparatus, according to the method of the invention, the cover is installed, open end down, over the backflow prevention apparatus. In preferred devices, grommets, tabs or other fasteners are located at or near the bottom to fasten anchor stakes for securing the installed device to the ground.

BRIEF DESCRIPTION OF THE DRAWINGS

FIG. 2 illustrates a lower corner of the cover for a water backflow prevention device affixed to a stake through a grommet.

FIG. 3 illustrates a lower corner of the cover for a water backflow prevention device affixed to a stake through ties.

FIG. 4 illustrates a lower corner of the cover for a water backflow prevention device affixed to a stake through a loop.

FIG. 5 illustrates a lower corner of the cover for a water backflow prevention device affixed to a stake through a flap.

FIG. 6 illustrates a lower corner of the cover for a water backflow prevention device affixed to a stake with a magnet.

DESCRIPTION

For the purposes of promoting an understanding of the principles of the invention, reference will now be made to different embodiments and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1:
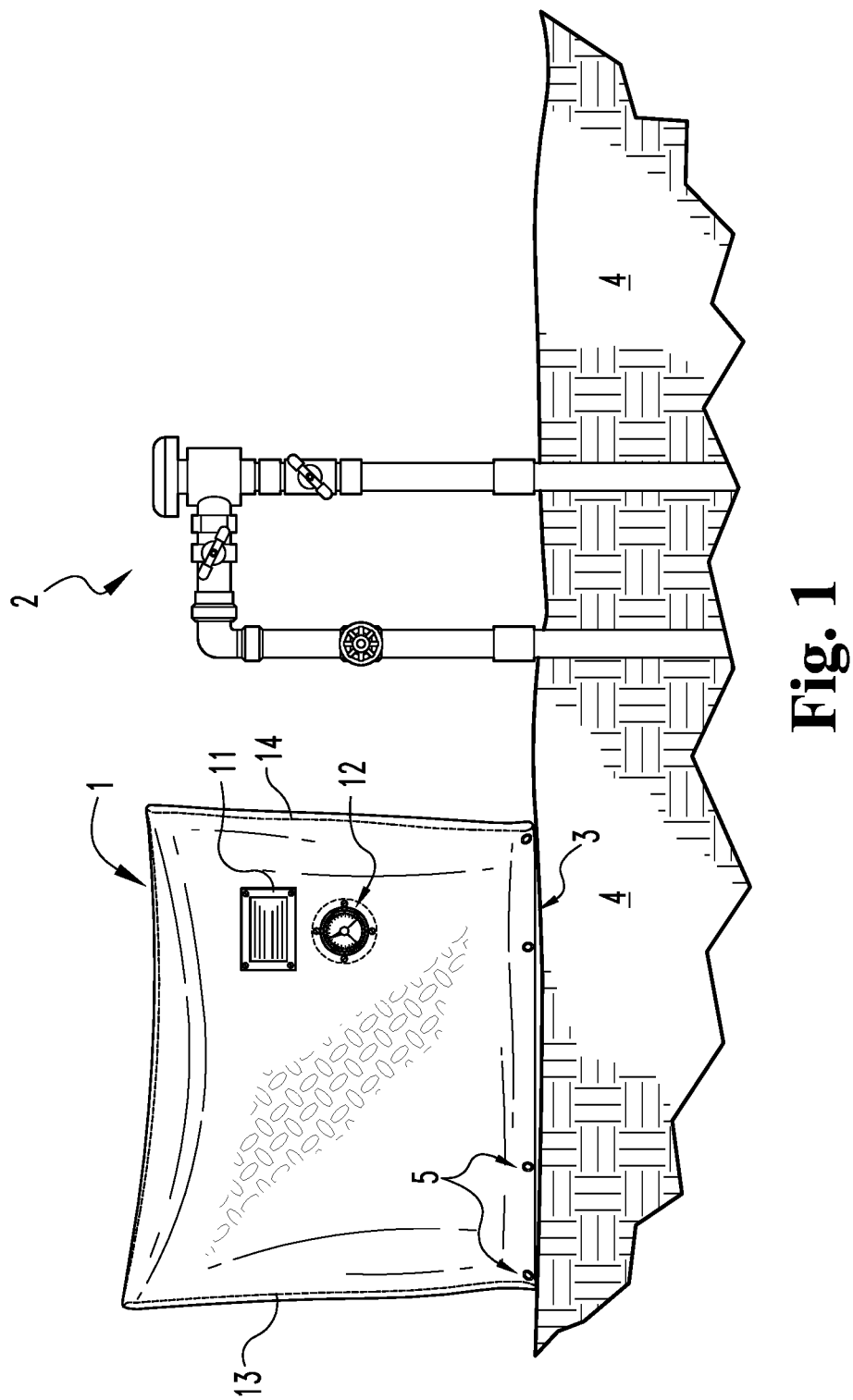
FIG. 1 illustrates an embodiment of the cover for a water backflow prevention apparatus and an uncovered water backflow prevention device.

Referring now to the drawings in detail, FIG. 1 shows an embodiment of applicant's cover 1 for a water backflow prevention apparatus and an uncovered backflow prevention apparatus 2. The cover has a "sack-like" shape with an opening 3 on one side to allow placement over the backflow device 2 and further has one or more connectors 5 for attachment to a stake 15 utilized to fix the cover 1 to the ground 4.

Preferred closed-cell polymeric foams are waterproof, opaque to UV radiation, and mildew resistant. The cover can be constructed from a closed cell polymeric foam having a thickness between about 0.03125 to about 0.75 of an inch, more preferably between about 0.0625 to about 0.50 of an inch, and most preferably between about 0.125 to about 0.375 of an inch. Certain embodiment of the closed-cell polymeric foam can be selected from the group consisting of:

ethylene propylene diene monomer rubber (EPDM),
ethylene vinyl acetate (EVA),
polyethylene-vinyl acetate (PEVA),
low-density polyethylene (LDPE),
first grade of polyethylene (PE),
nitrile rubber (NBR),
copolymers of acrylonitrile (ACN) a butadiene,
polychloroprene,
neoprene,
polyimide,
polypropylene (PP),
expanded polypropylene (EPP),
polypropylene paper (PPP)
polystyrene (PS),
extruded polystyrene (XPS),
expanded polystyrene (EPS),
polyurethane (PU),
polyethylene,
polyvinyl chloride (PVC)
silicone, and
microcellular.

Laminates including the polymeric foam or polymer bubbles sandwiched between sheets of natural or synthetic polymers, metal foils, and the like can similarly be utilized. One example of a suitable laminate is Reflectix® thermal insulation, a laminate having polymeric bubbles sandwiched between thin layers of an aluminum foil. The aluminum layer provides a barrier to infrared radiation. Reflectix® is a registered trademark assigned to Reflectix, Inc., Corporation Delaware 200 Riverfront Boulevard Elmwood Park N.J. 07407.

Figure 7:
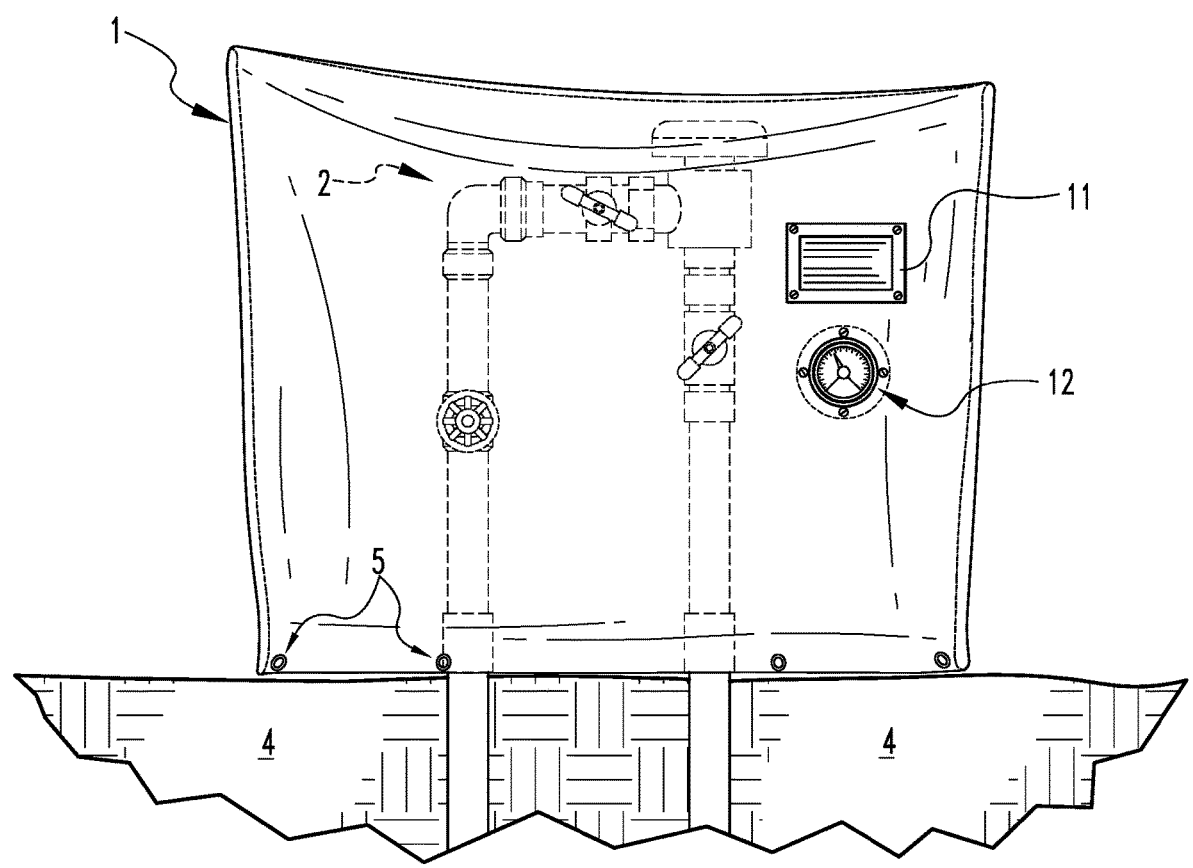
FIG. 7 illustrates an embodiment of the cover for a water backflow prevention apparatus formed by injection molding positioned and protecting a water backflow prevention device illustrated in FIG. 1

Certain embodiments of the cover can have connectors for attaching to stakes 15 anchored in the ground 4. Suitable connectors 5 can include, but are not limited to grommets 6, loops 7, flaps 8, ties 9, and magnets 10 (See FIGS. 2-6). Certain embodiments can have a plaque 11 (FIGS. 1 and 7) positioned on a surface selected to be visible when the cover is installed. The plaque can include emergency contact information, service information, advertisement, and the like. Still further, some embodiments can include a temperature sensing device 12 (FIGS. 1 and 7) installed to measure the cover's internal temperature and display it externally. In some embodiments, the temperature measured is the current internal temperature, and in other embodiments, the temperature measured is a minimum temperature experienced during a specific time period.

Embodiments of the cover 1 can be constructed from a single generally rectangular or square piece of open-cell polymeric foam by folding two ends over and stitching two of the sides to form seams 13 and 14. Other embodiments of the cover can be constructed by a molding process.

Any one of the embodiments of the cover can be utilized by taking the cover and installing it open end down, by moving it downward over the backflow prevention apparatus and conforming the open end of the bag to the ground 4 contour around the perimeter of the open end and thereby staking the open end to the ground 4 around the apparatus. Installed in this manner, all embodiments of the cover protect the water backflow prevention apparatus from cold temperatures, UV exposure, and resist mildew in damp environments. The open end of the cover in contact with the ground 4 also allows for heat maintained in the ground 4 to enter the cover from below and add warmth to the cover's contents. Stakes can be installed connecting to a variety of connectors to anchor the cover against wind and dislodgment by animals.

Different embodiments of the present invention provide protection of the water backflow prevention apparatus against a sharp drop of ambient temperature to a level below freezing, against UV damage, avoids microbial damage to the cover, and protects against dislodgement by wind and/or animals. The cover cut to size to adjust its height and can be conveniently installed and removed, according to need.

While the invention has been illustrated and described in detail in the drawings and foregoing description, the same is to be considered as illustrative and not restrictive in character, it being understood that only two embodiments have been shown and described and that all changes and modifications that come within the spirit of the invention are desired to be protected.

REFERENCE SIGNS (FIGURES)

1. backflow cover
2. backflow device (prior art)
3. opening in device
4. surface or ground
5. connectors
6. grommet
7. loop
8. flap
9. tie
10. magnet
11. plaque
12. temperature sensing device
13. first seam
14. second seam
15. stake

The invention claimed is:

1. A cover for a water backflow prevention apparatus comprising: a bag shaped device constructed from a closed cell polymeric foam, the bag-shaped device having an opening configured to enclose a backflow prevention apparatus and contact a surface below the backflow prevention apparatus in an open conformation, wherein the closed cell polymeric foam is water proof, mildew-resistant and provides a barrier to UV radiation and wherein the surface contacted is the ground.

2. The cover of claim 1 wherein the closed cell polymeric foam has a thickness between 0.03125 and 0.75 of an inch.

3. The cover of claim 1 wherein the cover is constructed from a polymeric foam selected from the group of polymeric foams consisting of:

ethylene propylene diene monomer rubber (EPDM),
ethylene vinyl acetate (EVA),
polyethylene-vinyl acetate (PEVA),
low-density polyethylene (LDPE),
first grade of polyethylene (PE),
nitrile rubber (NBR),
copolymers of acrylonitrile (ACN) a butadiene,
polychloroprene,
neoprene,
polyimide,
polypropylene (PP),
expanded polypropylene (EPP), polypropylene paper (PPP)
polystyrene (PS),
extruded polystyrene (XPS),
expanded polystyrene (EPS),
polyurethane (PU),
polyethylene,
polyvinyl chloride (PVC)
silicone, and
microcellular.

4. The cover of claim 1, wherein the cover is constructed of a laminate of a polymeric foam sandwiched between two layers, wherein the two layers include sheets selected from the group consisting of natural polymers, synthetic polymers, metal foils, and combinations thereof.

5. The cover of claim 4, wherein the laminate includes a metallic outer layer.

6. The cover of claim 5, wherein the laminate includes an aluminum outer layer.

7. The cover of claim 4, wherein the laminate includes a polymeric outer layer.

8. The cover of claim 1 having connectors for attaching to stakes selected from the group consisting of a grommet, a loop, a flap, a tie, and a magnet.

9. The cover of claim 1 having a substantially planar surface, the planar surface including a plaque providing written information.

10. The cover of claim 9, wherein the written information is selected from the group consisting of an emergency contact, contact information for servicing, and advertisement.

11. The cover of claim 1 including a temperature sensing device installed to measure the cover's internal temperature and display the internal temperature externally.

12. The cover of claim 11, wherein the internal temperature measured is a current internal temperature.

13. The cover of claim 11, wherein the internal temperature measured is a minimum temperature experienced during a specific time period.

14. The cover of claim 1, wherein the cover includes at least two edges formed by stitching or sewing to form at least two seams.

15. The cover of claim 1, wherein the cover lacks any seams and was formed by injection molding.

16. A method of covering a water backflow prevention apparatus with a cover and securing the cover to the ground, the method comprising the steps of:
    (a) providing the cover of claim 1, having an opening;
    (b) installing the opening of the cover over the water backflow prevention apparat wherein the opening includes a perimeter;
    (c) contacting and conforming the perimeter of the opening to the ground, and
    (d) attaching the perimeter of the opening to the ground around the apparatus.

17. The method of claim 16, wherein attaching the opening of the cover to the ground involves attaching the opening to at least one stake imbedded in the ground.

18. The method of claim 17, wherein attaching the opening of the cover to the ground involves attaching the at least one stake to a connector selected from the group consisting of a grommet, a loop, a flap, a tie, and a magnet.

* * * * *